(12) United States Patent
Tayamon et al.

(10) Patent No.: US 11,146,367 B2
(45) Date of Patent: Oct. 12, 2021

(54) METHOD AND APPARATUS FOR FREQUENCY SELECTIVE SCHEDULING IN OFDMA BASED WLANS

(71) Applicant: Telefonaktiebolaget LM Ericsson (publ), Stockholm (SE)

(72) Inventors: Soma Tayamon, Stockholm (SE); Hassan Halabian, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 324 days.

(21) Appl. No.: 16/303,204

(22) PCT Filed: May 27, 2016

(86) PCT No.: PCT/IB2016/053155
§ 371 (c)(1),
(2) Date: Nov. 20, 2018

(87) PCT Pub. No.: WO2017/203332
PCT Pub. Date: Nov. 30, 2017

(65) Prior Publication Data
US 2019/0207725 A1 Jul. 4, 2019

Related U.S. Application Data

(63) Continuation of application No. PCT/IB2016/053155, filed on May 27, 2016.

(51) Int. Cl.
*H04L 5/00* (2006.01)
*H04W 72/10* (2009.01)
(Continued)

(52) U.S. Cl.
CPC ....... *H04L 5/0007* (2013.01); *H04W 72/0453* (2013.01); *H04W 72/10* (2013.01); *H04W 72/085* (2013.01); *H04W 84/12* (2013.01)

(58) Field of Classification Search
CPC .................................................. H04L 5/0007
See application file for complete search history.

(56) References Cited

U.S. PATENT DOCUMENTS

2009/0122717 A1* 5/2009 Das .................... H04L 47/30
370/253
2010/0271963 A1 10/2010 Koorapaty et al.
(Continued)

FOREIGN PATENT DOCUMENTS

WO 2008/052195 A2 5/2008

OTHER PUBLICATIONS

International Search Report and Written Opinion of the International Searching Authority dated Feb. 28, 2017 issued in corresponding PCT Application No. PCT/IB2016/053155, consisting of 12 pages.
John Son et al. "Minimum Resource Granularity in OFDMA", Mar. 10, 2015; IEEE 802.11-15/0375r1, consisting of 10 pages.
Shahrnaz Azizi et al. "OFDMA Numerology and Structure", Mar. 9, 2015; IEEE 802.11-15/033r1, consisting of 38 pages.
(Continued)

*Primary Examiner* — Kodzovi Acolatse
*Assistant Examiner* — Abdeltif Ajid
(74) *Attorney, Agent, or Firm* — Sage Patent Group

(57) ABSTRACT

A network node for an orthogonal Frequency Division Multiplexing Access, OFDMA, based wireless local area network is provided. The network node includes processing circuitry. The processing circuitry includes a processor and a memory. The memory contains instructions that, when executed by the processor, configure the processor to reduce transmission time inequality among each of a plurality of wireless device during an OFDMA subframe by assigning a respective OFDMA subband of a plurality of OFDMA subbands to each of the plurality of wireless devices, and cause data transmission on the assigned OFDMA subbands to the plurality of wireless device.

24 Claims, 10 Drawing Sheets

(51) Int. Cl.
  *H04W 72/04* (2009.01)
  *H04W 84/12* (2009.01)
  *H04W 72/08* (2009.01)

(56) References Cited

U.S. PATENT DOCUMENTS

| | | | |
|---|---|---|---|
| 2011/0200001 A1* | 8/2011 | Choi | H04L 5/0037 370/329 |
| 2012/0195216 A1 | 8/2012 | Wu et al. | |
| 2014/0189105 A1* | 7/2014 | Takenaka | H04L 69/16 709/224 |
| 2015/0173070 A1 | 6/2015 | Aboul-Magd et al. | |
| 2016/0100408 A1 | 4/2016 | Hedayat | |
| 2016/0205672 A1* | 7/2016 | Kim | H04L 1/12 370/330 |
| 2017/0041929 A1* | 2/2017 | Noh | H04L 5/0094 |
| 2018/0020373 A1* | 1/2018 | Viger | H04W 74/0816 |
| 2018/0152935 A1* | 5/2018 | Hedayat | H04L 5/0057 |

OTHER PUBLICATIONS

Ron Porat et al. "Payload Symbol Size for 11 ax", Jan. 12, 2015; IEEE 802.11-15/0099, consisting of 33 pages.

Young-Bin Kim et al. "Considerations on 11 ax OFDMA Frequency Granularity", Jan. 13, 2015; IEEE 802.11-14/0082r1, consisting of 11 pages.

Harold J. Kushner "Convergence of Proportional-Fair Sharing Algorithms Under General Conditions", Jul. 2004; IEEE Transactions on Wireless Communications, vol. 3, No. 4; pp. 1250-1259; consisting of 10 pages.

Donald Parruca et al. "Analytical Model of Proportional Fair Scheduling in Interference-limited OFDMA/LTE Networks", Sep. 2013; IEEE Vehicular Technology Conference, consisting of 7 pages.

European Office Action issued in corresponding EP Application No. 16727229.3 dated Jul. 6, 2020, 06 Pages.

* cited by examiner

METHOD AND APPARATUS FOR FREQUENCY SELECTIVE SCHEDULING IN OFDMA BASED WLANS

CROSS-REFERENCE TO RELATED APPLICATIONS

This application is a Submission Under 35 U.S.C. § 371 for U.S. National Stage Patent Application of International Application Number: PCT/IB2016/053155, filed May 27, 2016 entitled "METHOD AND APPARATUS FOR FREQUENCY SELECTIVE SCHEDULING IN OFDMA BASED WLANs," the entirety of which is incorporated herein by reference.

TECHNICAL FIELD

The present disclosure relates to wireless communication, and in particular, to scheduling OFDMA subbands in a WLAN network to improve the overall OFDMA throughput.

BACKGROUND

Existing Wireless Local Area Network (WLANs) provide high wireless device throughput and enhanced internet access to wireless devices as compared with older technologies. While existing WLANs operate based on Institute of Electrical and Electronics Engineers (IEEE) 802.11 a/b/g/n/ac standards, there has been a drive to improve wireless spectral efficiency and provide enhanced user experience in terms of better throughput and lower outage in WLANs. Based on this drive, a study group has been established in the IEEE 802.11 committee to specify enhanced 802.11 Physical (PHY) and Medium Access Control (MAC) layer functionalities in the next version of 802.11 standards formally known as IEEE 802.11ax in the 2.4 and 5 GHz bands. The focus of IEEE 802.11ax will be on:

Improving spectrum efficiency and area throughput; and
Improving real world performance in indoor and outdoor deployments.

Based on target use cases in 802.11ax, some processes have been proposed to improve the PHY efficiency such as by using Orthogonal Frequency Division Multiplexing Access (OFDMA). While the idea of using Orthogonal Frequency Division Multiplexing (OFDM) has been already in use in IEEE 802.11 standard, e.g., in IEEE 802.11a/g/n/ac, the notion of OFDMA is proposed to be added in 802.11ax standard. By using OFDMA, a WLAN station including Access Point (AP) or non-AP stations (STAs) can use a sub-band of the entire bandwidth. This is in contrast to OFDM in which the entire bandwidth is used for each transmission.

In other words, the usable bandwidth is channelized into sub-bands and, based on some criteria, the sub-bands are allocated to the wireless devices either in the uplink (from wireless device to access point/base station) or the downlink (access point/base station to wireless device) for subsequent transmissions. By using OFDMA, a system can benefit from multi-wireless device and frequency diversity, i.e., each sub-band is allocated to the appropriate wireless device such as based on a known "fairness" algorithm. In IEEE 802.11ax OFDM numerology, one system has been proposed that uses four times larger Fast Fourier Transform (FFT) size for 20 MHz, i.e., 256 FFT size. A system has been proposed to define the IEEE 802.11ax sub-bands by aggregating a certain number of sub-carriers out of 256 available sub-carriers. For example one proposal is to define the pattern of sub-bands in the spectrum in which each sub-band is composed of 26 sub-carriers. Using such a setting there may be nine available sub-bands in the 20 MHz channel shown in FIG. 1.

The use of the OFDMA sub-band patterns will depend on the availability of a certain number of sub-bands allocated to the available transmissions such that maximum benefit out of multi-wireless device and frequency diversity are obtained. This concept is known as Frequency Selective Scheduling (FSS) in which a centralized scheduler node schedules the radio resources, i.e., sub-bands, to the requesting wireless devices. In WLAN similar to the cellular networks, the scheduler is located in the access coordinator which is the Access Point (AP). The sub-band scheduling might be done based on the estimated channel state information. The channel gain of each sub-band in this case is estimated by each wireless device using the pilot tones in each sub-band and then feedback to the AP for subsequent OFDMA scheduling decisions.

The notion of frequency selective resource scheduling has already been implemented in Long Term Evolution (LTE) networks. In general, the OFDMA resource scheduling algorithms can be categorized as channel-aware and channel-unaware algorithms. Note that LTE, unlike Wi-Fi, uses scheduled access technology in which all the uplink and downlink transmission are controlled and coordinated by the access coordinator which is the radio base station. In most of the sub-band allocation algorithms in LTE networks, a per sub-band (aka resource block or RB) metric is used which determines the priority of RB allocation to one of the requesting wireless devices as illustrated in Equation 1.

$$U_k = \arg\max_i \{m_{i,k}\} \quad\quad\quad \text{(Eq. 1)}$$

where k is the resource block index and i is the wireless device index and $m_{i,k}$ is the priority index of resource block k for wireless device i. Equation 1 says that resource block k is assigned to a wireless device that has the largest priority index $m_{i,k}$. In channel-unaware algorithms the index m is chosen independent of the gain of the channel over the resource blocks. Channel-unaware algorithms perform the scheduling decision of wireless devices without any need for the channel gain feedback. These channel-unaware algorithms cannot provide any throughput or fairness guarantee over the network. However, these algorithms are simple and easy to implement algorithms as they do not need to have a channel gain feedback mechanism to work. Examples of such algorithms are First-In First-Out (FIFO), Round Robin, Priority, Earliest Deadline First and Weighted Fair Queueing.

In contrast to channel-unaware algorithms, channel-aware algorithms are operating based on the resource block channel gain coefficients. Channel-aware algorithms need to have channel state of the sub-bands prior to performing any scheduling decision of wireless devices. Some well-known channel-aware algorithms include maximum throughput and proportional fair (PF) algorithms.

While the performance objective in the maximum throughput algorithms is to maximize the overall cell throughput, they fail to provide a fair resource allocation among the wireless devices and/or optimize the end-to-end throughput. The objective of the PF algorithm however, is to provide a notion of fairness in its allocation in a way that the proportion of the instantaneous potential rate and average throughput (flow throughput) is the same for all the wireless devices.

Channel-aware algorithms are designed to optimize a network performance attribute by allocating the sub-bands to the wireless devices based on the channel gain feedback from the wireless devices. One of the performance attributes is the overall network instantaneous throughput. The maximum throughput algorithm allocates each sub-band to the wireless devices whose channel gain is the highest. However, the maximum throughput algorithm operates blindly with respect to the queue lengths and packet sizes and the availability of data at the wireless devices' queue. Another issue with maximum throughput scheduling algorithm is that it fails to provide a fair resource allocation of the sub-bands to the wireless devices.

Further, in LTE networks, all the transmissions are synchronized and the scheduling is done at the level of resource blocks. In WLAN networks however, access to resources follows a random mechanism called Carrier Sense Multiple Access with collision Avoidance (CSMA/CA), and the transmissions are not synchronized. Different wireless devices might have different packet sizes with different modulation and coding scheme (MCS) rates for each packet. WLAN networks in contrast to LTE networks do not have fixed length frame transmissions. Thus, different sub-band allocation to different wireless devices might not result in simultaneous transmission completion. In other words, while there can be frequency diversity, there cannot be time diversity since a wireless device must use the allocated sub-band to transmit its packet until it finishes its transmission, thereby leading to transmission time inequality among wireless devices.

In WLANs, the notions of time slot and sub-frame as in LTE do not exist. This systematic difference between WLAN and LTE makes a substantial difference in the design of fair frequency selective scheduling algorithms. In other words, one cannot readily extend and apply the same scheduling strategies as used in LTE networks to OFDMA based WLANs, e.g., IEEE 802.11ax networks.

Further, among the channel-aware algorithms, the proportional fairness algorithm is the most accepted one in resource scheduling in wireless networks, e.g., LTE networks. Proportional fairness in WLANs based on the existing 802.11 standards (a/b/g/n/ac) will result in applying air-time fairness on the downlink scheduling algorithm. The air-time fairness algorithm tries to allocate the same share of the channel-time to the active wireless devices in the AP. By doing so, the wireless devices' throughputs will be proportional to the instantaneous channel gains, i.e., wireless devices with good channel conditions will get higher throughput with respect to wireless devices with poor channel conditions. However, the wireless devices with poor channel conditions will still have resources (equal to the wireless devices with good channel conditions) for their packet transmissions. In fact, less throughput in wireless devices with poor channel conditions is not because of lack of resource assignment but it is due to the poor channel conditions. Air-time fairness will provide equal amount of channel time to all wireless devices. The way the wireless device will use the allocated resource is dependent on their channel condition.

Extending the notion of proportional fair resource scheduling in OFDMA based WLANs (802.11ax) is not as straightforward as using air-time fairness. This is due to the fundamental systematic differences of the scheduling in OFDMA based WLANs. In the legacy 802.11 standards, the main radio resource is just channel-time as the whole spectrum is used for each individual transmission. However, in OFDMA based systems the resource definition extends to both time and frequency due to the introduction of sub-bands.

Since carrier sense multiple access with collision avoidance (CSMA/CA) in distributed coordination function (DCF) mode is a distributed channel access mechanism, it is very difficult to have optimized channel access in WLAN networks. APs cannot control the channel access of the non-AP stations in DCF mode. In the legacy 802.11 standards in which the PHY is OFDM and the access technique in the MAC layer is solely CSMA/CA, the AP only controls the downlink transmission schedules using a DL scheduling algorithm in the MAC layer. The algorithm typically used for DL scheduler at the AP is an air-time fairness algorithm whose objective is to allocate the same amount of DL channel-time to each wireless device. As mentioned earlier, in legacy 802.11 standard, the main network resource is the channel-time as the entire frequency bandwidth (all OFDM sub-carriers) are used for each single DL transmission, i.e., no notion of frequency domain resource scheduling.

It has been shown that air-time fairness provides proportional fair resource allocation to the wireless devices. In proportional fairness, the idea is to allocate the network resources such that the following objective function is maximized:

$$\sum_i \log R_i$$

where $R_i$ is the achieved throughput by wireless device i after the resource allocation. The summation is defined over all the wireless devices. As mentioned above, in OFDMA based WLAN networks the network resource is defined both in the time and frequency domain. Since in WLANs there is no notion of time slot allocation, each wireless device after sub-band allocation, uses all of its assigned subbands during the transmission of its packet. FIG. 2 shows an example with three wireless devices and five sub-bands in the one OFDMA transmission. Two wireless devices have grabbed two sub-bands while the third wireless device has only one sub-band for its transmission. As it is depicted in the figure, due to having different packet lengths and channel gains over different sub-bands, the transmission duration of different wireless devices may be different. In this case, over a time there is no transmission on certain sub-bands, those sub-bands are being wasted as they are being unused over those times. For instance, in FIG. 2 the portion of subband for wireless device 3 during interval T is being wasted.

SUMMARY

Some embodiments advantageously provide a network node and method for scheduling OFDMA subbands in a WLAN to improve (and in some cases maximize) the overall OFDMA throughput is provided.

According to one embodiment of the disclosure, a network node for an orthogonal Frequency Division Multiplexing Access, OFDMA, based wireless local area network is provided. The network node includes processing circuitry. The processing circuitry includes a processor and a memory. The memory contains instructions that, when executed by the processor, configure the processor to reduce transmission time inequality among each of a plurality of wireless device during an OFDMA subframe by assigning a respective OFDMA subband of a plurality of OFDMA subbands to each of the plurality of wireless devices, and cause data transmission on the assigned OFDMA subbands to the plurality of wireless device.

According to one embodiment of this aspect, each wireless device of the plurality of wireless devices is assigned one OFDMA subband of the plurality of OFDMA subbands before any of the plurality of wireless devices are assigned a second OFDMA subbands of the plurality of subbands. According to another embodiment of this aspect, the assignment is based on packet length and channel gain of respective ones of the plurality of OFDMA subbands.

According to another embodiment of this aspect, the memory contains further instructions that, when executed by the processor, configure the processor to sort a plurality of packets in one of an increasing and decreasing order based on a length of each packet, each packet of the plurality of packets being associated with a respective wireless device of the plurality of wireless devices. Reducing of transmission time inequality of each of the plurality of wireless device during an OFDMA subframe by assigning of the respective OFDMA subband of the plurality of OFDMA subbands to each of the plurality of wireless devices to includes assigning the plurality of OFDMA subbands to the plurality of wireless devices according to the sorted orders of the plurality of packets. The wireless device associated with a longest packet length of the plurality of packets is assigned the OFDMA subband with the highest performance characteristics of the plurality of OFDMA subbands for that wireless device.

According to another embodiment of this aspect, the reducing of transmission time inequality of each of the plurality of wireless device during an OFDMA subframe by assigning of the plurality of OFDMA subbands to the plurality of wireless devices to includes assigning each of the plurality of OFDMA subbands to a particular one of the plurality of wireless devices sorted randomly.

According to another embodiment of this aspect, each wireless device of the plurality of wireless devices is associated with a respective priority. The memory contains further instructions that, when executed by the processor, configure the processor to: sort the plurality of wireless devices in one of an increasing and decreasing order based on respective priorities of the plurality of wireless devices. Reducing of transmission time inequality of each of the plurality of wireless device during an OFDMA subframe by assigning of the respective OFDMA subband of the plurality of OFDMA subbands to each of the plurality of wireless devices to includes assigning the plurality of OFDMA subbands to the plurality of wireless devices according to the sorted orders of the plurality of wireless. The wireless device associated with the highest respective priority is assigned the OFDMA subband with the highest performance characteristics of the plurality of OFDMA subbands for that wireless device.

According to another embodiment of this aspect, the memory contains further instructions that, when executed by the processor, cause the processor to determine a transmission duration associated with each of the plurality of wireless devices. The transmission duration is based on OFDMA subbands that were previously assigned to at least one of the plurality of wireless devices. Reducing of transmission time inequality of each of the plurality of wireless device during an OFDMA subframe by assigning of the respective OFDMA subband of the plurality of OFDMA subbands to each of the plurality of wireless devices to includes assigning another OFDMA subband of the plurality of OFDMA subbands to a wireless device of the plurality of wireless devices having a maximum transmission duration of the determined transmission durations before assigning another OFDMA subband to the remaining plurality of wireless devices.

According to another embodiment of this aspect, the memory contains further instructions that, when executed by the processor, cause the processor to repeat the determination of the transmission duration associated with each of the plurality of wireless devices and repeat the assigning another OFDMA subband of the plurality of OFDMA subbands to a wireless device of the plurality of wireless devices until all OFDMA subbands have been assigned.

According to another embodiment of this aspect, reducing transmission time inequality among each of a plurality of wireless device during an OFDMA subframe by assigning a respective OFDMA subband of a plurality of OFDMA subbands to each of the plurality of wireless devices comprises calculating maximum transmission times of all the possible permutations of OFDMA subband allocations, determining an OFDMA subband allocation having a smallest maximum transmission length and allocating OFDMA subbands based on the OFDMA subband allocation determined to have the smallest maximum transmission length.

According to another embodiment of this aspect, the memory contains further instructions that, when executed by the processor, configure the processor to select the plurality of wireless devices for the assignment of the plurality of OFDMA subbands to provide resource allocation fairness among the plurality of wireless devices. According to another embodiment of this aspect, each of the plurality of wireless devices is assigned an allocation time corresponding to a total transmission time. The memory contains further instructions that, when executed by the processor, configure the processor to update the allocation time of each of the plurality of wireless device associated with an OFDMA transmission. Selecting the plurality of wireless devices for the assignment of the plurality of OFDMA subbands includes selecting the plurality of wireless devices having the largest remaining updated allocation time.

According to another embodiment of this aspect, the updating of the allocation time includes deducting a value from the allocation time of each wireless device associated with the OFDMA transmission. The value is based on an effective rate of the wireless device, a percentage of time the wireless device was involved in OFDMA transmissions and a current rate of wireless device as if wireless device is allocated an entire available frequency bandwidth.

According to one embodiment of the disclosure, a method of operation of a network node for an orthogonal Frequency Division Multiplexing Access, OFDMA, based wireless local area network is provided. Transmission time inequality is reduced among each of a plurality of wireless device during an OFDMA subframe by assigning a respective OFDMA subband of a plurality of OFDMA subbands to each of the plurality of wireless devices. Data transmission on the assigned OFDMA subbands is caused to the plurality of wireless device.

According to one embodiment of this aspect, each wireless device of the plurality of wireless devices is assigned one OFDMA subband of the plurality of OFDMA subbands before any of the plurality of wireless devices are assigned a second OFDMA subbands of the plurality of subbands. According to another embodiment of this aspect, the assignment is based on packet length and channel gain of respective ones of the plurality of OFDMA subbands.

According to another embodiment of this aspect, a plurality of packets are sorted in one of an increasing and decreasing order based on a length of each packet. Each packet of the plurality of packets is associated with a respective wireless device of the plurality of wireless devices. Reducing transmission time inequality of each of the plurality of wireless device during an OFDMA subframe by assigning of the respective OFDMA subband of the plurality of OFDMA subbands to each of the plurality of wireless devices to includes assigning the plurality of OFDMA subbands to the plurality of wireless devices according to the sorted orders of the plurality of the plurality of packets. The wireless device associated with a longest packet length of the plurality of packets is assigned the OFDMA subband with the highest performance characteristics of the plurality of OFDMA subbands for that wireless device.

According to another embodiment of this aspect, reducing transmission time inequality of each of the plurality of wireless device during an OFDMA subframe by assigning of the plurality of OFDMA subbands to the plurality of wireless devices to includes assigning each of the plurality of OFDMA subbands to a particular one of the plurality of wireless devices sorted randomly.

According to another embodiment of this aspect, each wireless device of the plurality of wireless devices is associated with a respective priority. The plurality of wireless devices are sorted in one of an increasing and decreasing order based on respective priorities of the plurality of wireless devices. Reducing transmission time inequality of each of the plurality of wireless device during an OFDMA subframe by assigning of the respective OFDMA subband of the plurality of OFDMA subbands to each of the plurality of wireless devices to includes assigning the plurality of OFDMA subbands to the plurality of wireless devices according to the sorted orders of the plurality of wireless devices. The wireless device associated with the highest respective priority is assigned the OFDMA subband with the highest performance characteristics of the plurality of OFDMA subbands for that wireless device.

According to another embodiment of this aspect, a transmission duration associated with each of the plurality of wireless devices is determined. The transmission duration is based on OFDMA subbands that were previously assigned to at least one of the plurality of wireless devices. Reducing transmission time inequality of each of the plurality of wireless device during an OFDMA subframe by assigning of the respective OFDMA subband of the plurality of OFDMA subbands to each of the plurality of wireless devices to includes assigning another OFDMA subband of the plurality of OFDMA subbands to a wireless device of the plurality of wireless devices having a maximum transmission duration of the determined transmission durations before assigning another OFDMA subband to the remaining plurality of wireless devices.

According to another embodiment of this aspect, the determination of the transmission duration associated with each of the plurality of wireless devices and the assigning another OFDMA subband of the plurality of OFDMA subbands to a wireless device of the plurality of wireless devices are repeated until all OFDMA subbands have been assigned.

According to another embodiment of this aspect, reducing transmission time inequality among each of a plurality of wireless device during an OFDMA subframe by assigning a respective OFDMA subband of a plurality of OFDMA subbands to each of the plurality of wireless devices includes calculating maximum transmission times of all the possible permutations of OFDMA subband allocations, determining an OFDMA subband allocation having a smallest maximum transmission length and allocating OFDMA subbands based on the OFDMA subband allocation determined to have the smallest maximum transmission length.

According to another embodiment of this aspect, the plurality of wireless devices for the assignment of the plurality of OFDMA subbands is selected to provide resource allocation fairness among the plurality of wireless devices. According to another embodiment of this aspect, each of the plurality of wireless devices is assigned an allocation time corresponding to a total transmission time. The allocation time of each of the plurality of wireless device associated with an OFDMA transmission is updated. Selecting the plurality of wireless devices for the assignment of the plurality of OFDMA subbands includes selecting the plurality of wireless devices having the largest remaining updated allocation time.

According to another embodiment of this aspect, the updating of the allocation time includes deducting a value from the allocation time of each wireless device associated with the OFDMA transmission. The value is based on an effective rate of the wireless device, a percentage of time the wireless device was involved in OFDMA transmissions and a current rate of wireless device as if wireless device is allocated an entire available frequency bandwidth.

According to another embodiment of the disclosure, a network node for an orthogonal Frequency Division Multiplexing Access, OFDMA, based wireless local area network is provided. The network node includes a subband assignment module configured to reduce transmission time inequality among each of a plurality of wireless device during an OFDMA subframe by assigning a respective OFDMA subband of a plurality of OFDMA subbands to each of the plurality of wireless devices, and cause data transmission on the assigned OFDMA subbands to the plurality of wireless device.

According to one embodiment of this aspect, the network node includes a device selection module configured to reduce channel time inequality among the plurality of wireless devices by selecting the plurality of wireless devices for the assignment of the plurality of OFDMA subbands.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
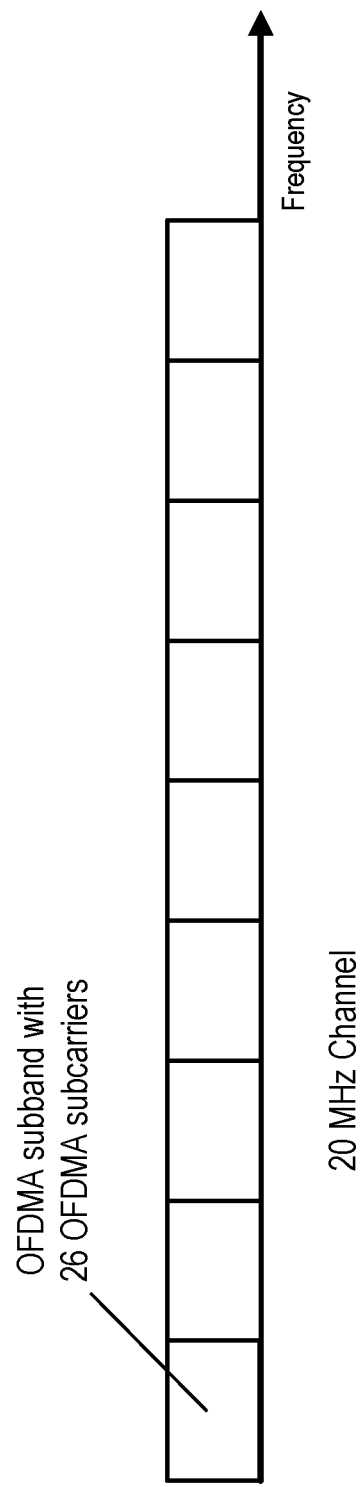
FIG. 1 is a block diagram of subbands in a 20 MHz channel.

In one or more embodiments, a network node and method for scheduling OFDMA subbands in a WLAN to improve the overall OFDMA throughput is provided.

In one or more embodiments, a two-phase Frequency Selective Scheduling (FSS) algorithm or process for Orthogonal Frequency Division Multiple Access (OFDMA) based Wireless Local Area Networks (WLANs) is provided. The FSS algorithm provides proportionally fair allocation of the available sub-bands to the active wireless devices present in a WLAN Basic Service Set (BSS). The FSS algorithm in the first phase (time domain scheduling phase) selects a fixed number of users for scheduling of sub-bands in the spectrum (frequency domain scheduling phase). The selection of wireless devices for the subsequent OFDMA transmission, in one or more embodiments, is performed using an extended air-time fairness algorithm in which the algorithm aims to guarantee weighted equal share of the channel-time to the wireless devices, i.e., to provide resource allocation fairness among the wireless devices. In contrast to the original air-time fairness where each wireless device is given an equal share of the channel-time, in the extended or modified air-time fairness algorithm or process described herein, each wireless device's weighted share of the channel-time is guaranteed to be equal to the rest of the wireless devices. The weight of each wireless device is equal to the OFDMA efficiency of the previous OFDMA transmissions. The number of the wireless devices selected for each OFDMA transmission is a parameter of the algorithm described herein and is chosen according to the number of sub-bands available in the system.

After selecting n wireless devices for an OFDMA frame transmission, in the second phase, i.e., frequency domain scheduling phase, of the FSS algorithm the subbands are allocated to the n selected wireless devices. The subband allocation to these wireless devices is done with the objective of improving (and in some cases maximizing) the overall OFDMA throughput and efficiency. In particular, the second phase addresses the problem of allocating a plurality of sub-band to n wireless devices with n packets with different sizes and different channel gains over different sub-bands. As mentioned above, the objective is to improve the overall OFDMA throughput, i.e., improving (and even maximizing in some cases) the effective rate of all the n wireless devices in the OFDMA frame, or to minimize the OFDMA frame transmission time. For this phase of the scheduling, in one or more embodiments, an iterative algorithm is used that takes into account the packet lengths, sub-band channel gains over all the sub-bands in the scheduling decisions as discussed herein.

Therefore, the instant disclosure's FSS process provides various advantageous over existing systems. For example, the instant disclosure provides proportionally fair frequency selective scheduling of the OFDMA sub-bands in ODFMA based WLAN networks, e.g., 802.11ax. The FSS process is able to be implemented in a relatively simple manner as the process is split into two phases of scheduling. Further, the FSS process aims to improve the overall OFDMA transmission throughput by minimizing the OFDMA transmission time and minimizing the resource wastage. Also, in the FSS process, the sub-band allocation takes into account the channel gain coefficients as well as the packet lengths. In the FSS process, the throughput (gain) improvement is provided over the MAC layer (and not only the PHY layer). By decreasing the wasted resources, the disclosure provides improved efficiency of OFDMA transmissions.

Before describing in detail exemplary embodiments, it is noted that the embodiments reside primarily in combinations of apparatus components and processing steps related to scheduling for Orthogonal Frequency division Multiple Access (OFDMA) based Wireless Local Area Networks (WLANs). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 3:
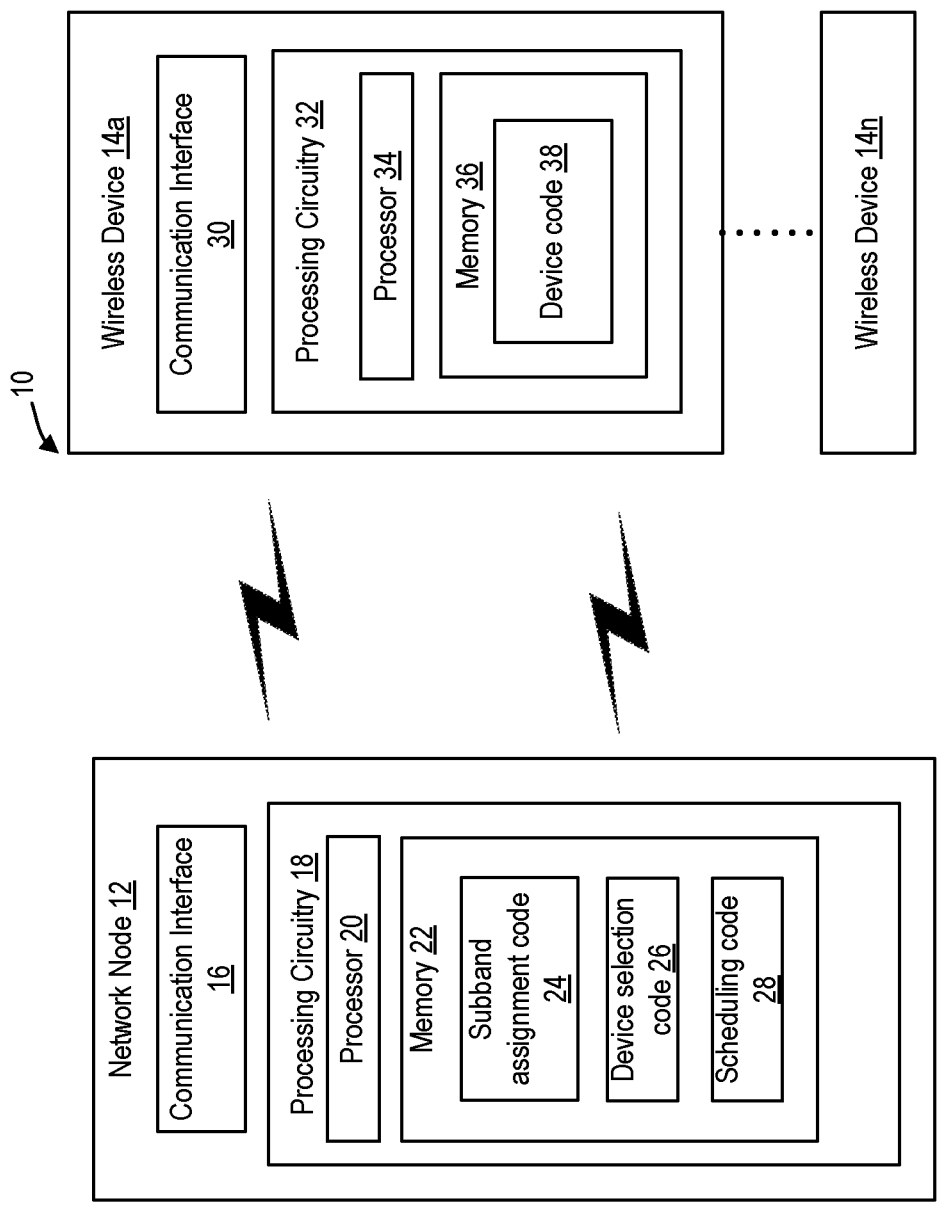
FIG. 3 is a block diagram of an exemplary system for scheduling in OFDMA based WLANs in accordance with the principles of the disclosure.

Referring now to drawing figures in which like reference designators refer to like elements there is shown in FIG. 3 an exemplary system for scheduling in OFDMA based WLANs in accordance with the principles of the disclosure and designated generally as "10." System 10 includes one or more network nodes 12 and wireless devices 14a-14n (collectively referred to as wireless device 14) in communication with each other via one or more communication links/ paths and/or networks via one or more communication protocols such as Long Term Evolution (LTE) based protocols and/or Institute of Electrical and Electronics Engineers (IEEE) 802.11 based protocols, e.g., IEEE 802.11ax protocol.

In one or more embodiments, network node 12 is an access point (AP) or other type of node that includes access point technology, including but not limited to APs supporting the IEEE 802.11ax protocol.

In one or more embodiments, wireless device 14 is a radio communication device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate wireless signals as are known in the art, including but not limited to wireless devices 14 supporting the IEEE 802.11ax protocol. Network node 12 includes one or more communication interfaces 16 for communicating with wireless devices 14, other network nodes 12 and/or other entities in system 10. In one or more embodiments, communication interface 16 is replaced by one or more transmitters, i.e., transmission circuitry, and one or more receivers, i.e., receiver circuitry, for communicating signals, packets, data, etc.

Network node 12 includes processing circuitry 18. Processing circuitry 18 includes processor 20 and memory 22. In addition to a traditional processor and memory, processing circuitry 18 may comprise integrated circuitry for processing and/or control, e.g., one or more processors and/or processor cores and/or FPGAs (Field Programmable Gate Array) and/or ASICs (Application Specific Integrated Circuitry). Processor 20 may be configured to access (e.g., write to and/or read from) memory 22, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 22 may be configured to store code executable by processor 20 and/or other data, e.g., data pertaining to communication, e.g., configuration and/or address data of nodes, etc. Processing circuitry 18 may be configured to control any of the methods and/or processes described herein and/or to cause such methods and/or processes to be performed, e.g., by network node 12. Corresponding instructions may be stored in the memory 22, which may be readable and/or readably connected to processor 20.

Processor 20 corresponds to one or more processors for performing network node 12 functions described herein. Memory 22 is configured to store data, programmatic software code and/or other information described herein. Memory 22 is configured to store subband assignment code 24. For example, subband assignment code 24 includes instructions that, when executed by processor 20, causes processor 20 to perform the process discussed in detail with respect to FIGS. 4-7. Memory 22 is configured to store device selection code 26. For example, device selection code 26 includes instructions that, when executed by processor 20, causes processor 20 to perform the process discussed in detail with respect to FIGS. 8 and 9. Memory 22 is configured to store scheduling code 28. For example, scheduling code 28 includes instructions that, when executed by processor 20, causes processor 20 to perform the process discussed in detail with respect to FIG. 10.

Wireless device 14 includes one or more communication interfaces 30 for communicating with network nodes 12, other wireless devices 14 and/or other entities in system 10. In one or more embodiments, communication interface 30 is replaced by one or more transmitters, i.e., transmission circuitry, and one or more receivers, i.e., receiver circuitry, for communicating signals, packets, data, etc.

Wireless device 14 includes processing circuitry 32. Processing circuitry 32 includes processor 34 and memory 36. In addition to a traditional processor and memory, processing circuitry 32 may comprise integrated circuitry for processing and/or control, e.g., one or more processors and/or processor cores and/or FPGAs (Field Programmable Gate Array) and/or ASICs (Application Specific Integrated Circuitry). Processor 34 may be configured to access (e.g., write to and/or read from) memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 36 may be configured to store code executable by processor 34 and/or other data, e.g., data pertaining to communication, e.g., configuration and/or address data of nodes, etc. Processing circuitry 32 may be configured to control any of the methods and/or processes described herein and/or to cause such methods and/or processes to be performed, e.g., by wireless device 14. Corresponding instructions may be stored in the memory 36, which may be readable and/or readably connected to processor 34.

Processor 34 corresponds to one or more processors for performing wireless device 14 functions. Memory 36 is configured to store data, programmatic software code and/or other information, including what is described herein. Memory 22 is configured to store device code 38. For example, device code 38 includes instructions that, when executed by processor 34, causes processor 34 to perform wireless device 14 functions as are known in the art. In one or more embodiments, wireless device 14 is a radio communication device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Figure 4:
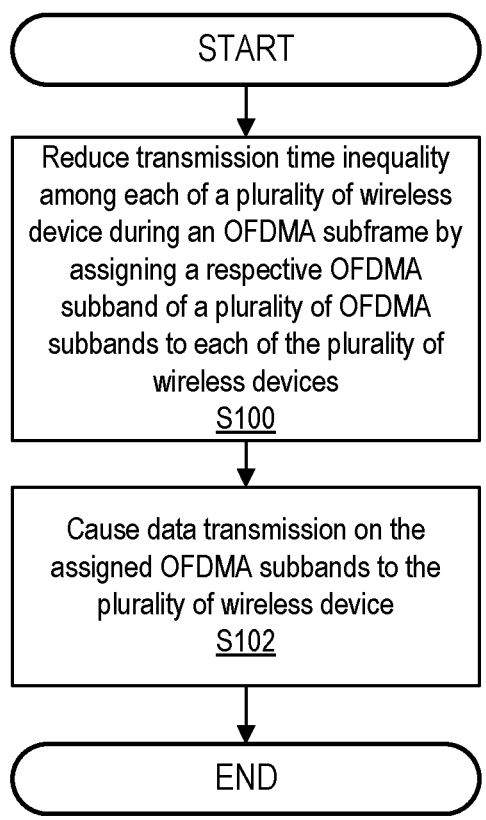
FIG. 4 is a flow diagram of one embodiment of an exemplary subband assignment process in accordance with the principles of the disclosure.

FIG. 4 is a flow diagram of one embodiment of an exemplary subband assignment process of subband assignment code 24 in accordance with the principles of the disclosure. In particular, the subband assignment process is a frequency domain scheduling algorithm that aims to reduce transmission time inequality.

Processing circuitry 18 reduces transmission time inequality among each of a plurality of wireless device 14 during an OFDMA subframe by assigning a respective OFDMA subband of a plurality of OFDMA subbands to each of the plurality of wireless devices 14 (Block S100). For example, S subbands are scheduled among the plurality of wireless devices 14, i.e., among a selected plurality of wireless devices 14 as discussed below with respect to FIGS. 8 and 9, to improve the effective OFDMA rate of wireless devices 14 involved in the next OFDMA transmission.

In some implementations, to improve and even maximize the effective OFDMA rates of the plurality of wireless devices 14, i.e., of n wireless devices 14, involved in the next OFDMA transmission, the OFDMA transmission time needs to be minimized. To minimize the OFDMA transmission time, the subband assignment process uses the channel gains of the plurality of wireless devices 14 over all the available sub-bands as well as the packet length of the plurality of wireless devices 14.

In one or more embodiments, Block S102 is performed in two phases including an initialization phase followed by an iterative phase. In one or more embodiments, the initialization phase is configured to assign a respective subband of a plurality of subbands to each of the plurality of wireless devices 14 that has not been assigned a subband for next OFDMA transmission such that: (1) each of the plurality of wireless devices 14 is assigned a respective subband and there may or may not be unassigned subbands left for next OFDMA transmission, (2) or at least some of the plurality of wireless devices 14 have been assigned a respective subband and there are no more unassigned subbands for next OFDMA transmission.

In one or more embodiments, the initialization phase is based on performing a full search and assigning the n subbands to the plurality of wireless devices 14 such that the maximum transmission length (based on the assigned subbands) among the plurality of wireless devices 14, i.e., n wireless devices, is minimized. This allocation is an example of an efficient initialization assignment. In order to accomplish the allocation, in one embodiment the maximum transmission times of all the possible permutations of OFDMA subband allocations are calculated, and the OFDMA subband allocation with the smallest maximum transmission length is determined. OFDMA subbands are then allocated based on the allocation determined to have the smallest maximum transmission length.

Figure 5:
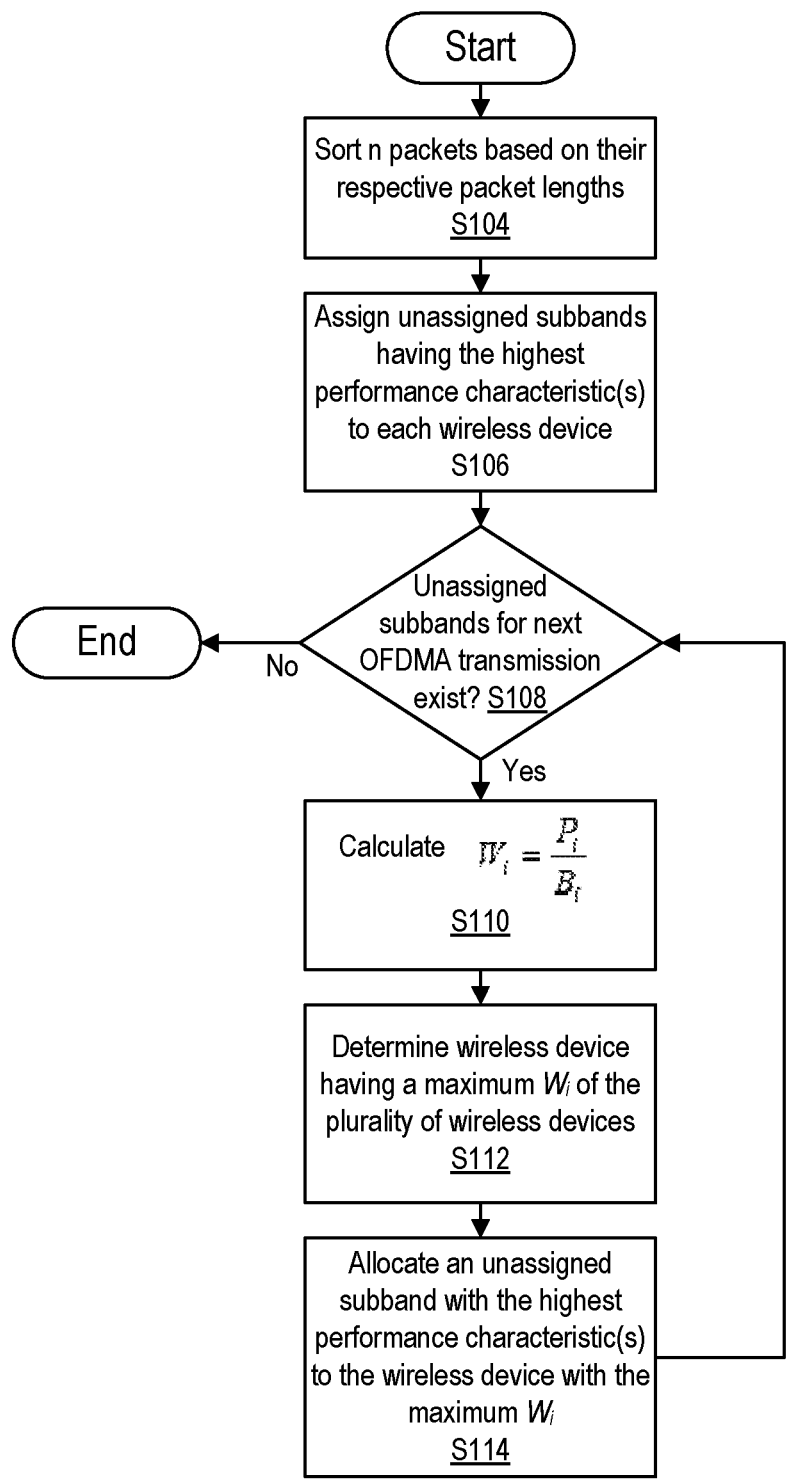
FIG. 5 is a flow diagram of one embodiment of the process of Block S100 in accordance with the principles of the disclosure.

An example of the assignment of n subbands that may be based on packet length as described in detail with respect to FIG. 5.

In one or more embodiments, the initialization phase is based on allocating subbands, i.e., n subbands, among the plurality of wireless devices 14 randomly sorted, i.e., n wireless devices 14. In one or more embodiments, the initialization phase is based on sorting the plurality of wireless devices 14 based on a priority previously assigned to the plurality of wireless devices 14. For example, a list of the plurality of wireless devices 14 is sorted based on the respective priority and a list of the n subbands is sorted based on one or more respective performance characteristics of the subbands. In one or more embodiments, the one or more performance characteristics of the subbands includes channel gain and/or maximum modulation-coding rate. The plurality of wireless devices 14 are assigned a respective subband of the n subbands according to the sorted orders of the lists of wireless devices 14. The wireless device 14 with the highest priority is assigned the OFDMA subband with the highest performance characteristic(s) of the S subbands. In one or more embodiments, the initialization phase is based other information such as at least one of packet lengths, the channel quality of the subbands for each wireless device 14 and wireless device 14 priorities.

After the initialization phase, any remaining, i.e., unassigned subbands (if any) are assigned based on an iterative process. In particular, for each of the plurality of wireless devices 14, a parameter $W_i$ is defined as $$W_i = \frac{P_i}{B_i}$$

where $P_i$ is the packet length of wireless device 14($i$) and $B_i$ is the total modulation-coding rate if the packet is transmitted by the previously assigned subbands. $W_i$ is an estimate of the transmission duration of the packet as if the packet only used subbands that were previously assigned to wireless device 14. Then, wireless device 14 with the maximum $W_i$ is allocated an unassigned subband having the highest one or more performance characteristics, discussed above and has its corresponding $W_i$ updated. This assigning of subbands based on maximum $W_i$ is repeated until there are no unassigned subbands for the next OFDMA transmission. In other words, the iterative phase or process is trying to balance the transmission duration of n wireless devices 14 involved in the OFDMA transmission. The iterative phase or process is further discussed with respect to FIG. 5.

Processing circuitry 18 causes data transmission on the assigned OFDMA subbands to the plurality of wireless device 14 (Block S102). For example, processing circuitry 18 causes transmission by communication interface 16 to the plurality of wireless devices 14 on assigned OFDMA subbands determined in Block S100.

FIG. 5 is a flow diagram of one embodiment of the process of Block S100 in accordance with the principles of the disclosure. In particular, Blocks S104 and S106 are part of one embodiment of the initialization phase or process discussed above, and Blocks S108-S114 are part of the iterative phase or process discussed above. Processing circuitry 18 sorts n packets based on their respective packet lengths (Block S104). In one or more embodiments, processing circuitry 18 sorts n packets associated with n wireless devices 14 based on the length of the packet. For example, n wireless devices are sorted in one of ascending and descending order. Processing circuitry 18 assigns unassigned subbands (for next OFDMA transmission) having one or more of the highest performance characteristic to each wireless device 14, i.e., wireless device 14 having the longest packet length is assigned the unassigned subband having the highest performance characteristic(s) for that wireless device 14 (Block S106). In one or more embodiments, each wireless device 14 is assigned only one subband in Block S106 or in the initialization phase.

Processing circuitry 18 determines whether unassigned subbands for next OFDMA transmission exist (Block S108). If processing circuitry 18 determines there are no unassigned subbands for the next OFDMA transmission, the process ends. If processing circuitry 18 determines unassigned subbands exists, processing circuitry 18 calculates $$W_i = \frac{P_i}{B_i},$$

as discussed above, for the plurality of wireless devices 14, i.e., for n wireless devices 14 (Block S110).

Processing circuitry 18 determines the wireless device 14 having a maximum $W_i$ of the plurality of wireless devices 14 (Block S112). Processing circuitry 18 allocates an unassigned subband with the highest one or more performance characteristics, as discussed above, to the wireless device 14 with the maximum W (Block S114). Processing circuitry 18 then performs the determination of Block S108. By assigning the unassigned subband having the highest one or more performance characteristics to wireless device 14 associated with the highest $W_i$ i.e., highest estimated transmission duration of the packet as if wireless device 14 only uses previously assigned subbands, the $W_i$ of that wireless device 14 will be reduced as assigning more subbands to wireless device 14 for next OFDMA transmission shortens the transmission time for wireless device 14, as illustrated and discussed with respect to FIGS. 6-7. In other words, wireless device 14 with the longest packet length will be assigned first and assign the subband with the highest performance characteristics. Then the user with the second maximum packet length is assigned the unassigned subband with the highest performance characteristic(s) by its best sub-band and so on. In one or more embodiments, performance characteristics include at least one of channel gain and maximum modulation-coding rate. In other words, the next wireless device 14 with the maximum $W_i$ is allocated the unassigned subband with the highest performance characteristic(s) to it and has its $W_i$ updated. This process is repeated until there is no sub-band left. The process of Block S108-S114 are trying to balance the transmission duration of the n wireless devices 14 involved in the OFDMA transmission.

Figure 2:
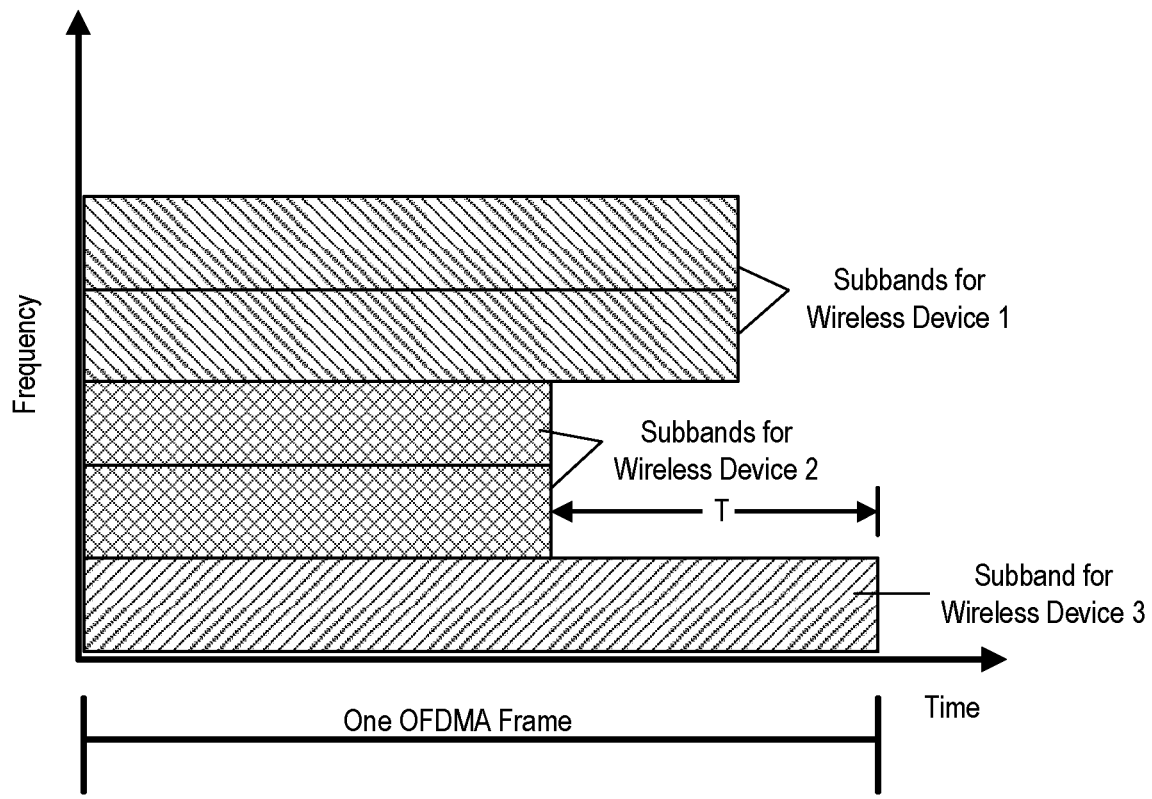
FIG. 2 is a block diagram of an allocation of subbands to wireless devices using an existing allocation method.
Figure 6:
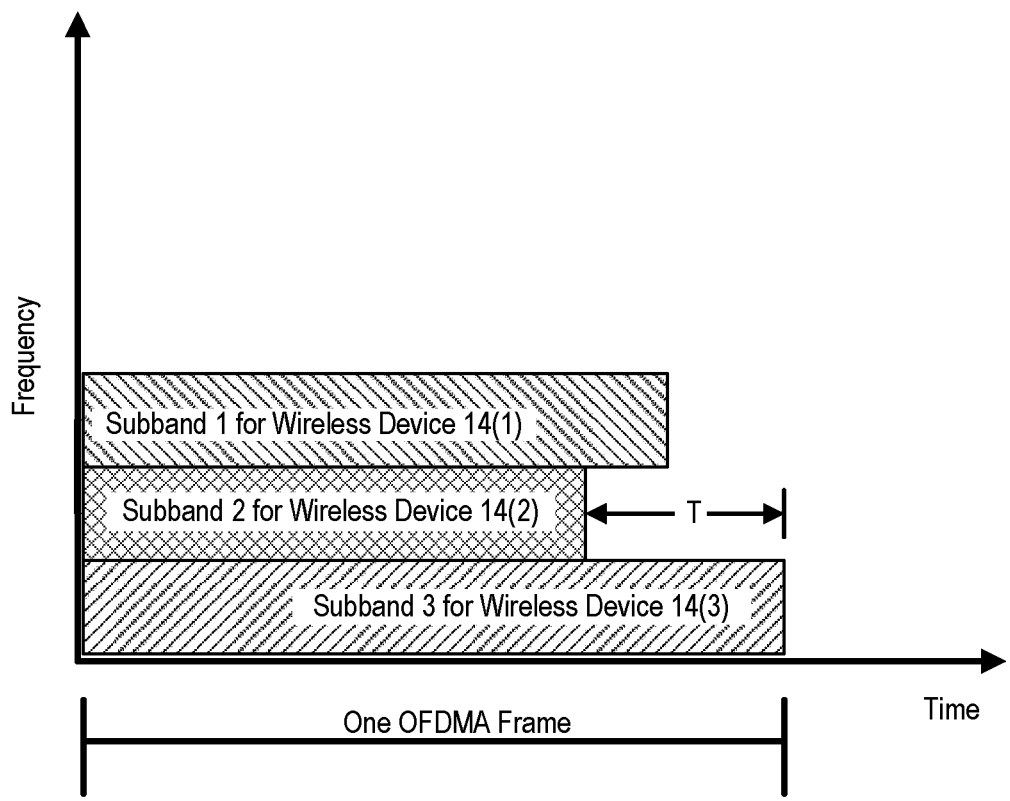
FIG. 6 illustrates one example of the results of an initialization phase in accordance with the principles of the disclosure.

FIG. 6 illustrates one example of the result of the initialization phase or process, discussed above, in accordance with the principles of the disclosure. In particular, the example of FIG. 6 assumes n=3 such that three wireless devices 14 are being assigned subbands. Wireless device 14(1) is assigned subband 1, wireless device 14(2) is assigned subband 2 and wireless device 14(3) is assigned subband 3. As illustrated in FIG. 6, the initial result of the initialization phase, in one example, results in different transmissions times but with reduced inequality compared with existing methods such as the method of FIG. 2.

Figure 7:
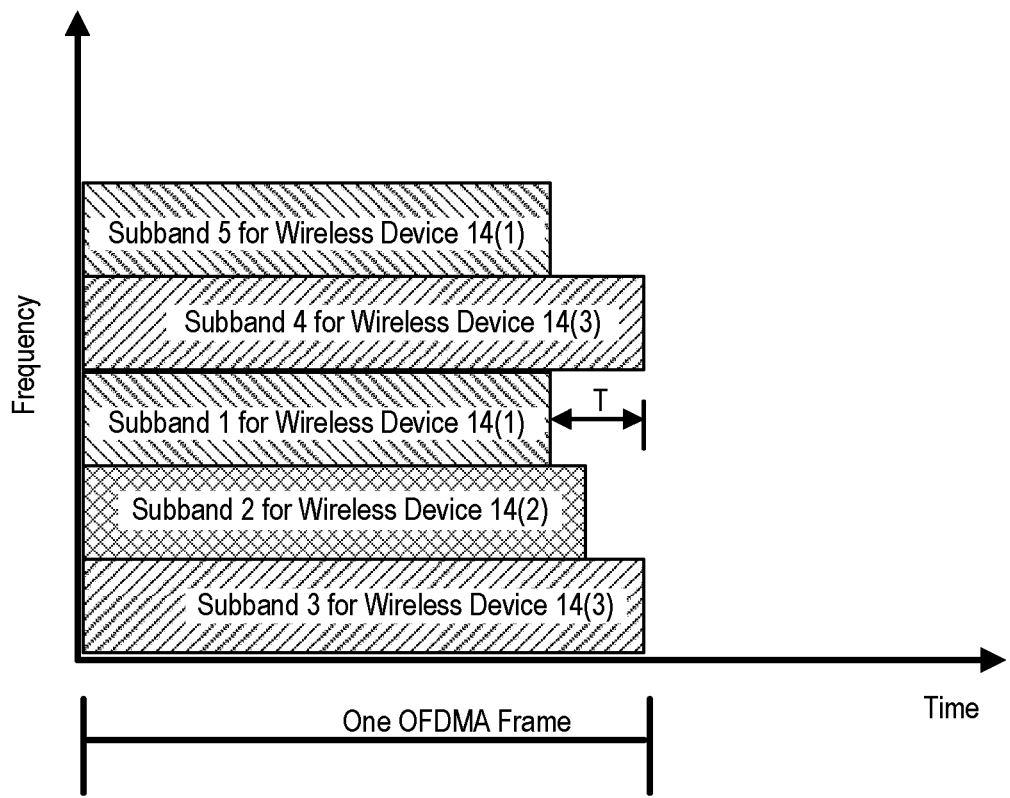
FIG. 7 illustrates one example of the result of a loop of an iterative phase in accordance with the principles of the disclosure.

FIG. 7 illustrates one example of the result of a loop of the iterative phase, discussed above, in accordance with the principles of the disclosure. In particular, subband 4 is assigned to wireless device 14(3) such as based on the iterative phase of Blocks S108-S114, thereby reducing the next OFDMA transmission time associated with wireless device (3). Further, subband 5 is assigned to wireless device 14(1) such as based on the iterative phase of Blocks S108-S114, thereby reducing the next OFDMA transmission time associated with wireless device (1). As illustrated in FIG. 7, the transmission time inequality T among wireless devices (1)-(3) during the OFDMA subframe has been reduced, thereby improving the effective OFDMA rates of wireless devices 14(1)-(3).

In some embodiments, if the number of wireless devices 14 with packets to transmit is higher than a number n of devices 14, a device selection algorithm or time domain scheduling algorithm can be used to provide a certain level of fairness, e.g., proportional fairness, among the wireless devices. In one or more embodiments, the selection is performed based on the proportional fairness principle such that the device selection process will ensure that all wireless devices 14 get OFDMA shares that satisfy the following equation:

$$\frac{\bar{r}_i^{eff}}{\bar{r}_i} T_i^{OFDMA} = \frac{\bar{r}_j^{eff}}{\bar{r}_j} T_j^{OFDMA}$$

for any two different users i and j, where $\bar{r}_i$ is the PHY (current) rate of wireless device 14(i) as if wireless device 14(i) is allocated the entire frequency bandwidth, i.e., as if no OFDMA is implemented or used, $r_i^{eff}$ is the effective rate of wireless device 14(i) in the OFDMA frame transmission as discussed above, and $T_i^{OFDMA}$ is the share of wireless device 14(i)'s OFDMA frame transmission, i.e., the percentage of the time wireless device 14(i) was involved in one OFDMA transmission. In other words, the device selection process will ensure that wireless devices 14 get an equal weighted share of the OFDMA channel-time, i.e., there is resource allocation fairness among the wireless devices 14. The weight of each wireless device 14 is defined as the ratio of wireless device 14's effective OFDMA rate and non-OFDMA (using the entire channel) rate. MAC layer throughput $(R_i)$ of wireless device 14(i) is calculated as $R_i = \bar{r}_i^{eff} T_i^{OFDMA}$.

Figure 9:
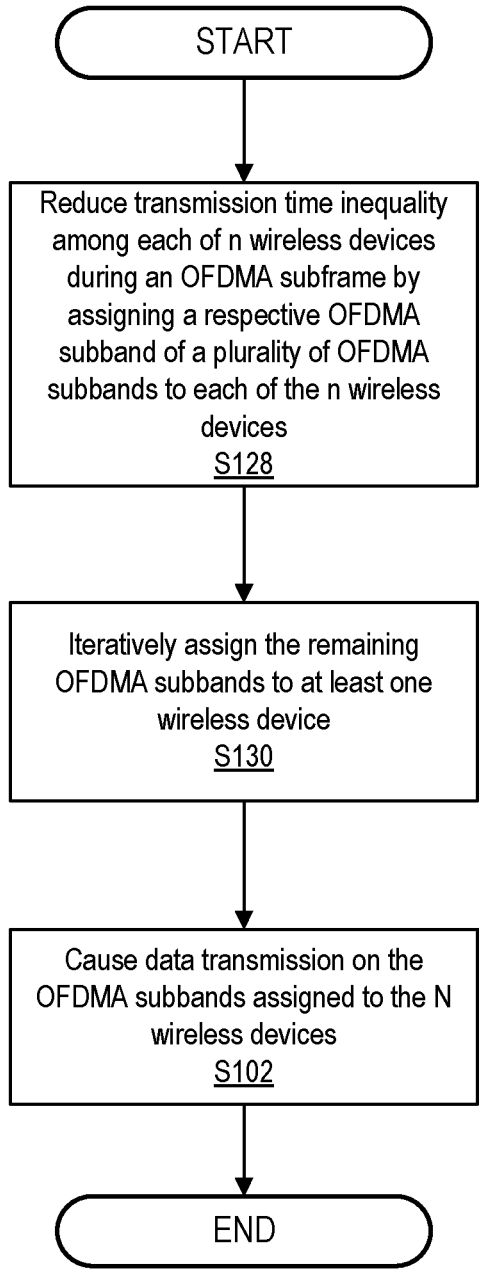
FIG. 9 is a flow diagram of an exemplary scheduling process in accordance with the principles of the disclosure.

In one or more embodiments of this selection process, a deficit round robin process is used as discussed in detail with respect to FIG. 9. In one or more other embodiments, the selection is performed based on random selection of wireless devices 14 for next OFDMA transmission. In one or more other embodiments, the selection is performed based on selecting wireless devices 14 in a round robin process when wireless devices 14 are present and active on the network, e.g., with packets to transmit. In one or more other embodiments, wireless devices 14 are selected based only on $T_i^{OFDMA}$ and not the weighted values of $T_i^{OFDMA}$ i.e., n wireless devices 14 with the minimum time allocation will be selected for the next OFDMA transmission. In one or more other embodiments, the selection is performed based on a respective priority in which the n wireless devices 14 with the highest priority are selected for next OFDMA transmission. Other possibilities exist if a device selection scheme is desired or necessary.

Figure 8:
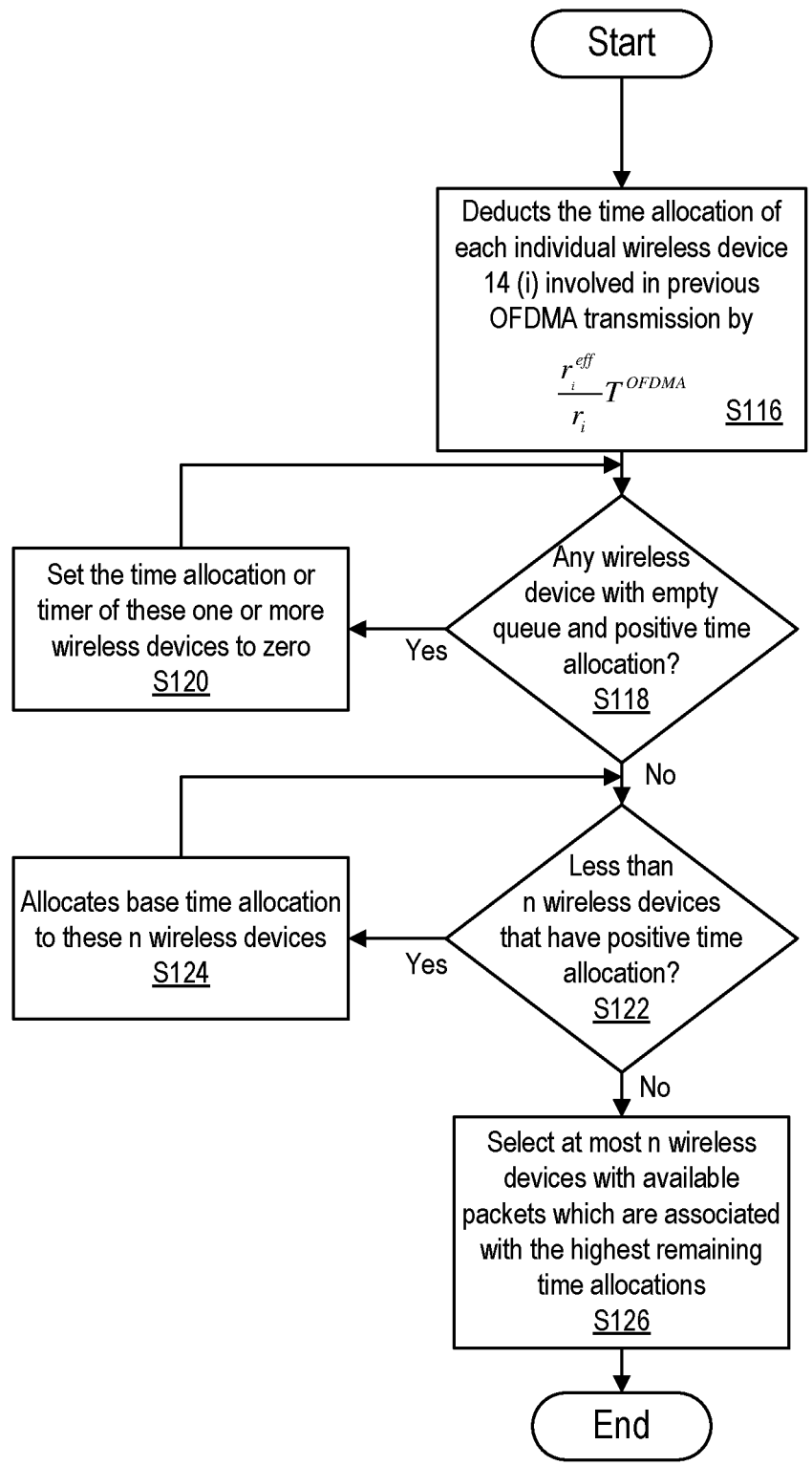
FIG. 8 is a flow diagram of an exemplary deficit round robin algorithm of one embodiment of the device selection process in accordance with the principles of the disclosure.

FIG. 8 is a flow diagram of an exemplary deficit round robin algorithm of one embodiment of the device selection process in accordance with the principles of the disclosure. The deficit round robin algorithm allocates a fixed amount of base time allocation to each wireless device 14 present or communicating with network node 14, i.e., to each wireless device 14 whose queue is not empty at network node 14. In one or more embodiments, the base time allocation is 500 ms or another predefined time based on design need and/or parameters of the network. The process commences for a new OFDMA transmission for which wireless devices 14 are to be selected and subbands assigned. Processing circuitry 18 deducts the time allocation of each individual wireless device 14 (i) involved in previous OFDMA transmission by $$\frac{r_i^{eff}}{r_i} T^{OFDMA}$$

or a weighted share of OFDMA channel-time (Block S116). In other words, after each OFDMA transmission, time allocations of wireless device 14 that were involved in OFDMA transmission are deducted from the available time allocation of wireless devices 14.

Processing circuitry 18 determines if any wireless device has an empty queue and positive time allocation (Block S118). For example, for the next OFDMA transmission one or more wireless devices 14 may have no pending data for transmission in queue but have positive time allocations. If processing circuitry 18 determines any wireless device 14 has both a positive time allocation and an empty queue, processing circuitry 18 sets the time allocation or timer of these one or more wireless devices 14 to zero (Block S120). Setting the time allocation to zero for absent wireless devices 14, i.e., wireless devices 14 with empty queues, prevents these wireless devices 14 from accumulating time allocation for future OFDMA transmissions. Wireless devices 14 with no allocation may have time allocated for future transmission (if allocation is needed at that time) in accordance with step S124 below.

If processing circuitry 18 determines there are no wireless devices 14 with both a positive time allocation and empty queue, processing circuitry 18 determines if there are less than n wireless devices 14 that have positive time allocation (Block S122). If processing circuitry 18 determines there are less than n wireless devices 18 that have positive time allocations, processing circuitry 18 allocates base time allocation to these n wireless devices 14 (Block S124). For example, if less than n queues associated with n wireless devices 14 have positive time allocation left, the base time allocations, e.g., 500 ms, are redistributed to the time allocation of these n wireless devices 14, i.e., to these n active wireless devices 14. Processing circuitry 18 then performs the determination of Block S122.

Referring back to Block S122, if processing circuitry 18 determines there are not less than n wireless devices 14 that have positive time allocations, processing circuitry 18 selects at most n wireless devices 14 with available packet(s) which are associated with the highest remaining time allocations (Block S126). In other words, for scheduling of wireless devices 14 for each OFDMA frame, n wireless devices having the largest amount of time allocation remaining are selected for OFDMA frame transmission. In one or more embodiments, the n is a number of wireless devices 14 that are less than the number of available subbands.

FIG. 9 is a flow diagram of an exemplary scheduling process of scheduling code 28 in accordance with the principles of the disclosure. Processing circuitry 18 is configured to select n wireless devices 14, i.e., a plurality of wireless devices 14, for the assignment of the plurality of OFDMA subbands as discussed above. Processing circuitry 18 reduces transmission time inequality among each of n wireless devices during an OFDMA subframe by assigning a respective OFDMA subband of a plurality of OFDMA subbands to each of the n selected wireless devices (Block S128). In particular, Block S128 is the initialization phase or process of Block S102 as discussed above. Processing circuitry 18 iteratively assigns the remaining OFDMA subbands, if any, to at least one wireless device 14 (Block S130). In particular, Block S130 is the iterative phase or process of Block S102 as discussed above. Processing circuitry 18 causes data transmission on the OFDMA subbands assigned to the n wireless devices 14 (Block S102).

Figure 10:
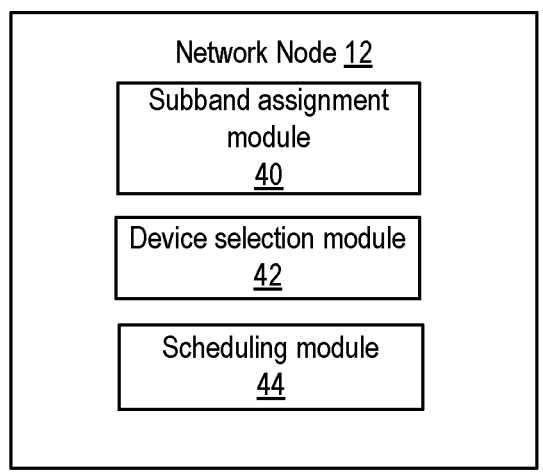
FIG. 10 is an alternative embodiment of a network node in accordance with the principles of the disclosure.

FIG. 10 is an alternative embodiment of network node 12 in accordance with the principles of the disclosure. Network node 12 includes subband assignment module 40 for performing the subband assignment process described in detail with respect to FIGS. 4-7. For example, in one or more embodiments, network node 12 performs orthogonal Frequency Division Multiplexing Access, OFDMA, based wireless local area network, and includes subband assignment module 40 configured to reduce transmission time inequality among each of a plurality of wireless device during an OFDMA subframe by assigning a respective OFDMA subband of a plurality of OFDMA subbands to each of the plurality of wireless devices, as discussed above with respect to FIGS. 4-7. Subband assignment module 40 is further configured to cause data transmission on the assigned OFDMA subbands to the plurality of wireless device.

Network node 12 includes device selection module 42 for performing the wireless device 14 selection process described in detail with respect to FIG. 8. For example, in one or more embodiments, device selection module 42 is configured to select the plurality of wireless devices 14 for the assignment of the plurality of OFDMA subbands. Network node 12 includes scheduling module 44 for performing the scheduling process described in detail with respect to FIG. 9. For example, in one or more embodiments, network node 12 includes scheduling module 44 that is configured to select n wireless devices 14 for the assignment of the plurality of OFDMA subbands, as discussed above. Scheduling module 44 is further configured to assign a respective OFDMA subband of a plurality of OFDMA subbands to each of the n wireless devices 14, as discussed above with respect to Block S128. Scheduling module 44 is further configured to iteratively assign the remaining OFDMA subbands to at least one wireless device 14, as discussed above with respect to Block S130. Scheduling module 44 is configured to cause data transmission on the OFDMA subbands assigned to the n wireless devices 14.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for an Orthogonal Frequency Division Multiplexing Access (OFDMA) based wireless local area network, the network node comprising: processing circuitry, the processing circuitry including a processor and a memory, the memory containing instructions that, when executed by the processor, configure the processor to: reduce transmission time inequality among each of a plurality of wireless devices during an OFDMA subframe by assigning a respective OFDMA subband of a plurality of OFDMA subbands to each of the plurality of wireless devices based on a smallest maximum transmission length among the assigned OFDMA subbands; and cause data transmission on the assigned OFDMA subbands to the plurality of wireless devices;

wherein the reducing of the transmission time inequality among each of the plurality of wireless devices during the OFDMA subframe by assigning of the respective OFDMA subband of the plurality of OFDMA subbands to each of the plurality of wireless devices comprises:

calculating maximum transmission times of all possible permutations of OFDMA subband allocations;

determining an OFDMA subband allocation having the smallest maximum transmission length; and allocating OFDMA subbands of the plurality of OFDMA subbands based on the OFDMA subband allocation determined to have the smallest maximum transmission length.

2. The network node of claim 1, wherein each wireless device of the plurality of wireless devices is assigned one OFDMA subband of the plurality of OFDMA subbands before any of the plurality of wireless devices are assigned a second OFDMA subband of the plurality of OFDMA subbands.

3. The network node of claim 1, wherein the assignment is further based on a packet length and a channel gain of respective ones of the plurality of OFDMA subbands.

4. The network node of claim 1, wherein the memory contains further instructions that, when executed by the processor, configure the processor to: sort a plurality of packets in one of an increasing and decreasing order based on a length of each packet of the plurality of packets, each packet of the plurality of packets being associated with a respective wireless device of the plurality of wireless devices; and the reducing of the transmission time inequality of each of the plurality of wireless devices during the OFDMA subframe by assigning of the respective OFDMA subband of the plurality of OFDMA subbands to each of the plurality of wireless devices includes: assigning the plurality of OFDMA subbands to the plurality of wireless devices according to the sorted orders of the plurality of packets, a wireless device associated with a longest packet length of the plurality of packets being assigned the OFDMA subband with a highest performance characteristic of the plurality of OFDMA subbands for that wireless device.

5. The network node of claim 4, wherein the memory contains further instructions that, when executed by the processor, cause the processor to: determine a transmission duration associated with each of the plurality of wireless devices, the transmission duration being based on OFDMA subbands that were previously assigned to at least one of the plurality of wireless devices; and wherein the reducing of the transmission time inequality of each of the plurality of wireless devices during the OFDMA subframe by assigning of the respective OFDMA subband of the plurality of OFDMA subbands to each of the plurality of wireless devices further includes: assigning another OFDMA subband of the plurality of OFDMA subbands to a wireless device of the plurality of wireless devices having a maximum transmission duration of the determined transmission durations before assigning an OFDMA subband of the plurality of OFDMA subbands to the remaining plurality of wireless devices.

6. The network node of claim 5, wherein the memory contains further instructions that, when executed by the processor, cause the processor to: repeat the determination of the transmission duration associated with each of the plurality of wireless devices; and repeat the assigning of the another OFDMA subband of the plurality of OFDMA subbands to the wireless device of the plurality of wireless devices until all the plurality of OFDMA subbands have been assigned.

7. The network node of claim 1, wherein the reducing of the transmission time inequality of each of the plurality of wireless devices during the OFDMA subframe by assigning of the plurality of OFDMA subbands to the plurality of wireless devices includes: assigning each of the plurality of OFDMA subbands to a particular one of the plurality of wireless devices sorted randomly.

8. The network node of claim 1, wherein each wireless device of the plurality of wireless devices is associated with a respective priority; wherein the memory contains further instructions that, when executed by the processor, configure the processor to: sort the plurality of wireless devices in one of an increasing and decreasing order based on the respective priorities of the plurality of wireless devices; and wherein the reducing of the transmission time inequality of each of the plurality of wireless devices during the OFDMA subframe by assigning of the respective OFDMA subband of the plurality of OFDMA subbands to each of the plurality of wireless devices includes: assigning the plurality of OFDMA subbands to the plurality of wireless devices according to the sorted orders of the plurality of wireless devices, a wireless device associated with a highest respective priority being assigned the OFDMA subband with a highest performance characteristic of the plurality of OFDMA subbands for that wireless device.

9. The network node of claim 1, wherein the memory contains further instructions that, when executed by the processor, configure the processor to: select the plurality of wireless devices for the assignment of the plurality of OFDMA subbands to provide resource allocation fairness among the plurality of wireless devices.

10. The network node of claim 9, wherein each of the plurality of wireless devices is assigned an allocation time corresponding to a total transmission time; the memory containing further instructions that, when executed by the processor, configure the processor to update the allocation time of each of the plurality of wireless devices associated with an OFDMA transmission; and wherein the selecting of the plurality of wireless devices for the assignment of the plurality of OFDMA subbands includes: selecting the plurality of wireless devices having a largest remaining updated allocation time.

11. The network node of claim 10, wherein the updating of the allocation time includes deducting a value from the allocation time of each wireless device of the plurality of wireless devices associated with the OFDMA transmission, the value being based on an effective rate of a wireless device, a percentage of time the wireless device was involved in the OFDMA transmission, and a current rate of the wireless device as if the wireless device is allocated an entire available frequency bandwidth.

12. A method of operation of a network node for an Orthogonal Frequency Division Multiplexing Access (OFDMA) based wireless local area network, the method comprising: reducing transmission time inequality among each of a plurality of wireless devices during an OFDMA subframe by assigning a respective OFDMA subband of a plurality of OFDMA subbands to each of the plurality of wireless devices based on a smallest maximum transmission length among the assigned OFDMA subbands; and causing data transmission on the assigned OFDMA subbands to the plurality of wireless devices;
wherein the reducing of the transmission time inequality among each of the plurality of wireless device devices during the OFDMA subframe by assigning of the respective OFDMA subband of the plurality of OFDMA subbands to each of the plurality of wireless devices comprises: calculating maximum transmission times of all possible permutations of OFDMA subband allocations; determining an OFDMA subband allocation having the smallest maximum transmission length; and allocating OFDMA subbands of the plurality of OFDMA subbands based on the OFDMA subband allocation determined to have the smallest maximum transmission length.

13. The method of claim 12, wherein each wireless device of the plurality of wireless devices is assigned one OFDMA subband of the plurality of OFDMA subbands before any of the plurality of wireless devices are assigned a second OFDMA subband of the plurality of OFDMA subbands.

14. The method of claim 12, wherein the assignment is further based on a packet length and a channel gain of respective ones of the plurality of OFDMA subbands.

15. The method of claim 12, further comprising: sorting a plurality of packets in one of an increasing and decreasing order based on a length of each packet of the plurality of packets, each packet of the plurality of packets being associated with a respective wireless device of the plurality of wireless devices, wherein reducing the transmission time inequality of each of the plurality of wireless devices during the OFDMA subframe by assigning the respective OFDMA subband of the plurality of OFDMA subbands to each of the plurality of wireless devices includes: assigning the plurality of OFDMA subbands to the plurality of wireless devices according to the sorted orders of the plurality of packets, a wireless device associated with a longest packet length of the plurality of packets being assigned the OFDMA subband with a highest performance characteristic of the plurality of OFDMA subbands for that wireless device.

16. The method of claim 15, further comprising: determining a transmission duration associated with each of the plurality of wireless devices, the transmission duration being based on OFDMA subbands that were previously assigned to at least one of the plurality of wireless devices,
wherein reducing the transmission time inequality of each of the plurality of wireless devices during the OFDMA subframe by assigning the respective OFDMA subband of the plurality of OFDMA subbands to each of the plurality of wireless devices further includes: assigning another OFDMA subband of the plurality of OFDMA subbands to a wireless device of the plurality of wireless devices having a maximum transmission duration of the determined transmission durations before assigning an OFDMA subband of the plurality of OFDMA subbands to the remaining plurality of wireless devices.

17. The method of claim 16, further comprising repeating the determination of the transmission duration associated with each of the plurality of wireless devices and repeating the assigning of the another OFDMA subband of the plurality of OFDMA subbands to the wireless device of the plurality of wireless devices until all the plurality of OFDMA subbands have been assigned.

18. The method of claim 12, wherein reducing the transmission time inequality of each of the plurality of wireless devices during the OFDMA subframe by assigning the plurality of OFDMA subbands to the plurality of wireless devices includes: assigning each of the plurality of OFDMA subbands to a particular one of the plurality of wireless devices sorted randomly.

19. The method of claim 12, wherein each wireless device of the plurality of wireless devices is associated with a respective priority; the method further comprising: sorting the plurality of wireless devices in one of an increasing and decreasing order based on the respective priorities of the plurality of wireless devices; and wherein reducing the transmission time inequality of each of the plurality of wireless devices during the OFDMA subframe by assigning the respective OFDMA subband of the plurality of OFDMA subbands to each of the plurality of wireless devices includes: assigning the plurality of OFDMA subbands to the plurality of wireless devices according to the sorted orders of the plurality of wireless devices, a wireless device associated with a highest respective priority being assigned the OFDMA subband with a highest performance characteristic of the plurality of OFDMA subbands for that wireless device.

20. The method of claim 12, further comprising selecting the plurality of wireless devices for the assignment of the plurality of OFDMA subbands to provide resource allocation fairness among the plurality of wireless devices.

21. The method of claim 20, wherein each of the plurality of wireless devices is assigned an allocation time corresponding to a total transmission time; the method further comprising updating the allocation time of each of the plurality of wireless devices associated with an OFDMA transmission, and wherein selecting the plurality of wireless devices for the assignment of the plurality of OFDMA subbands includes: selecting the plurality of wireless devices having a largest remaining updated allocation time.

22. The method of claim 21, wherein updating the allocation time includes deducting a value from the allocation time of each wireless device of the plurality of wireless devices associated with the OFDMA transmission, the value being based on an effective rate of [a wireless device, a percentage of time the wireless device was involved in the OFDMA transmission, and a current rate of the wireless device as if the wireless device is allocated an entire available frequency bandwidth.

23. A computer program product comprising a non-transitory computer readable medium storing a computer program comprising instructions which, when executed on at least one processor of a network node for an Orthogonal Frequency Division Multiplexing Access (OFDMA) based wireless local area network, cause the at least one processor to: reduce transmission time inequality among each of a plurality of wireless devices during an OFDMA subframe by assigning a respective OFDMA subband of a plurality of OFDMA subbands to each of the plurality of wireless devices based on a smallest maximum transmission length among the assigned OFDMA subbands; and cause data transmission on the assigned OFDMA subbands to the plurality of wireless devices;

wherein the reducing of the transmission time inequality among each of the plurality of wireless device devices during the OFDMA subframe by assigning of the respective OFDMA subband of the plurality of OFDMA subbands to each of the plurality of wireless devices comprises: calculating maximum transmission times of all possible permutations of OFDMA subband allocations; determining an OFDMA subband allocation having the smallest maximum transmission length; and allocating OFDMA subbands of the plurality of OFDMA subbands based on the OFDMA subband allocation determined to have the smallest maximum transmission length.

24. The computer program product of claim 23, wherein the instructions further cause the at least one processor to reduce channel time inequality among the plurality of wireless devices by selecting the plurality of wireless devices for the assignment of the plurality of OFDMA subbands.

* * * * *